Jan. 3, 1933.  H. D. GEYER ET AL  1,892,944
RUBBER COVERED LEAF SPRING
Filed Feb. 27, 1930

Patented Jan. 3, 1933

1,892,944

UNITED STATES PATENT OFFICE

HARVEY D. GEYER AND ARTHUR H. FLOWER, OF DAYTON, OHIO, ASSIGNORS TO THE INLAND MANUFACTURING COMPANY, OF DAYTON, OHIO, A CORPORATION OF DELAWARE

RUBBER COVERED LEAF SPRING

Application filed February 27, 1930. Serial No. 431,805.

This invention relates to protective casings for leaf springs.

An object of this invention is to provide a snugly fitting elastic casing upon a leaf spring which will efficiently prevent dirt and water from contacting with the spring leaves and sooner or later causing increased friction between the leaves and thereby changing the characteristics of the spring.

Another object is to provide an economical and efficient method of encasing a leaf spring with such a casing.

Further objects and advantages of the present invention will be apparent from the following description, reference being had to the accompanying drawing wherein a preferred embodiment of one form of the present invention is clearly shown.

Figure 1:
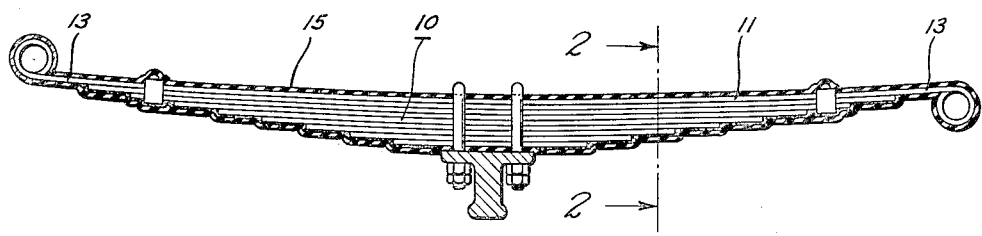
Fig. 1 is a side elevation of an automobile leaf spring having a soft rubber casing applied thereto according to this invention. The near side of the rubber casing is shown cut away.
Figure 2:
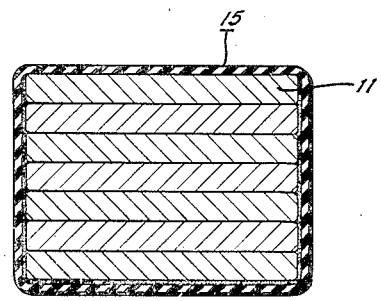
Fig. 2 is a transverse section on line 2—2 of Fig. 1 but on a larger scale.

According to this invention a fully assembled leaf spring 10, shown in the drawing as having eight leaves, is provided with an integral soft rubber casing 15 which fits snugly around and encases the entire spring with the exception of the spring eyes on the projecting ends of the long leaf 11 of the spring. In Fig. 1 of the drawing all but the interior surface of the spring eyes is shown as encased by the rubber casing, however, the outer covering on the spring eye is not necessary or essential. The rubber casing however preferably extends far enough to snugly enclose the projecting ends 13 of the long leaf 11 and is preferably bonded to the metal leaf in order to insure against possibility of water or dirt entering the protective casing 15 at the ends thereof. If even a very small amount of water should enter casing 15 at the ends thereof it would remain within the casing in contact with the spring leaves a long time since it would have little or no chance to evaporate and escape therefrom. Hence in time the leaves would rust and the amount of friction between the relatively sliding leaves would be changed. Also such moisture may harmfully affect or change the consistency of the lubricant between the spring leaves which likewise would change the amount of friction between the leaves when the spring is flexed. In either case the characteristics of the spring would be changed. In automobile manufacture the spring characteristics are quite carefully determined and matched up with the weight of the supported body and the hydraulic shock absorber which are now commonly used in connection with the springs. Hence it is highly undesirable to have any change in the spring characteristics during use such as are caused by dirt, rust, or other foreign matter getting in between the leaves, or any change in the lubricant, such as graphite paste, which may be used between the leaves. The elastic rubber cover 15 of this invention protects the spring against such incidents and thus maintains the spring characteristics substantially constant for very long periods.

This casing 15 may be applied to the assembled spring 10 by the general electro-deposition method of applying rubber coatings upon simple metal articles as disclosed in Patent 1,476,374, issued December 4, 1923 to Sheppard et al. If this method be used, the side surfaces of the spring, that is, the edges of the leaves, and preferably also their exposed bottom surfaces are treated with an electrically conducting graphite coating to prevent the deposited rubber coating from adhering strongly to these metal surfaces. Preferably the top surface of the long leaf 11 and all sides of the projecting ends 13 of the long leaf 11 are left uncoated with graphite and are thoroughly cleaned prior to the electro-deposition of the rubber coating so that the rubber will adhere firmly to these surfaces. After the rubber coating is deposited upon the assembled spring forming a very snugly fitting integral casing therefor it is vulcanized in place by well known methods, such as open steam vulcanization. After vulcanization the rubber casing 15 will adhere strongly to the metal along the top surface of long leaf 11 and around the projecting ends 13 of said long leaf but will not adhere to the surfaces of the spring which had been previously coated with graphite. Hence the elastic casing 15 will very closely and neatly fit the spring 10 but will not be damaged by the relative sliding of the leaves upon each other when the spring is flexed. The interposed graphite coating is useful also in reducing friction between the spring leaves and casing during flexure of the spring, hence there will be less wear and tear upon the rubber casing.

If desired, instead of using the electro-deposition method of applying the rubber coating, unvulcanized sheet rubber of desired thickness may be applied mechanically to the assembled spring to completely cover same with the exception, preferably, of the spring eyes, after which the rubber covered spring may be tightly wrapped with tape and vulcanized in place upon the spring to form an integral soft rubber casing thereupon. Or the vulcanized rubber casing may be deposited upon the spring by coagulating the rubber thereupon from a suitable latex solution according to a known method. When these methods are used the spring may have all surfaces where tight adherence of the rubber is not desired covered with graphite or any other suitable substance as soapstone, while other surfaces where adherence is desired are properly cleaned and possibly otherwise treated to encourage or strengthen the bond between the rubber and metal created during vulcanization.

In some cases it may be desired to vulcanize the applied rubber casing within a mold, the other steps remaining as described hereinabove.

While the form of embodiment of the present invention as herein disclosed, constitutes a preferred form, it is to be understood that other forms might be adopted, all coming within the scope of the claims which follow.

What is claimed is as follows:

1. A multiple leaf spring having an elastic rubber casing vulcanized in place thereupon, the two ends of said casing snugly surrounding the two projecting ends of the longest leaf of said spring whereby to prevent water from entering said casing and rusting or otherwise harming said spring.

2. In combination, a multiple leaf spring having a projecting long leaf, a one-piece close-fitting casing of elastic rubber vulcanized in situ thereupon, the two ends of said rubber casing being bonded to the projecting portions of said long leaf to provide a seal between said spring and casing, said casing being also bonded to the top face of said long leaf but being free from the edges of the spring leaves whereby to permit relative sliding between said leaves and casing when the spring is flexed.

In testimony whereof we hereto affix our signatures.

ARTHUR H. FLOWER.
HARVEY D. GEYER.